(12) United States Patent
Buquet et al.

(10) Patent No.: US 8,749,112 B2
(45) Date of Patent: Jun. 10, 2014

(54) METHOD FOR BALANCING THE MOVEMENT OF MOBILE MASSES IN A BI-LINEAR ELECTRODYNAMIC MOTOR

(75) Inventors: Jonathan Buquet, La Murette (FR); Gérald Aigouy, La Croix de la Rochette (FR); Thierry Trollier, Eybens (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 1304 days.

(21) Appl. No.: 12/530,723

(22) PCT Filed: Jan. 11, 2008

(86) PCT No.: PCT/FR2008/050053
§ 371 (c)(1),
(2), (4) Date: Nov. 21, 2011

(87) PCT Pub. No.: WO2008/110704
PCT Pub. Date: Sep. 18, 2008

(65) Prior Publication Data
US 2012/0056565 A1 Mar. 8, 2012

(30) Foreign Application Priority Data

Mar. 14, 2007 (FR) ...................................... 07 53813

(51) Int. Cl.
*H02K 33/00* (2006.01)
(52) U.S. Cl.
USPC ......................................... 310/309; 318/128
(58) Field of Classification Search
USPC ......................................... 310/309; 318/128
See application file for complete search history.

(56) References Cited

U.S. PATENT DOCUMENTS 5,582,013 A * 12/1996 Neufeld ............................... 62/6
6,094,912 A * 8/2000 Williford ......................... 60/520
(Continued)

FOREIGN PATENT DOCUMENTS

GB 2 318 887 5/1998

OTHER PUBLICATIONS

International Search Report for PCT/FR2008/050053.
(Continued)

*Primary Examiner* — Derek Rosenau
*Assistant Examiner* — Bryan Gordon
(74) *Attorney, Agent, or Firm* — Christopher J. Cronin; Emmanuel de Cuenca

(57) ABSTRACT

The motion of the magnetized movable masses of a bilinear electrodynamic motor comprising two movable masses moving in opposite senses parallel to the axis (x-x) of the motor is balanced. At least one first magnetic sensor and at least one second magnetic sensor are provided which are able to deliver respectively a first electrical signal ($s_1(t)$) and a second electrical signal ($s_2(t)$) respectively representative of the motion of a first and of a second movable mass. An error signal ($\Delta s(t)$) equal to the difference between the said first ($s_1(t)$) and second ($s_2(t)$) electrical signals is recorded. A harmonic analysis of the error signal performed. A sinusoidal excitation signal ($e_1(t)$) at a given frequency $f_0$ is applied to the first movable mass. N successive excitation signals ($e_2''(t)$) are iteratively applied to the second movable mass, an excitation signal of rank n ($0 \leq n \leq N-1$) being equal to a Fourier series of order n of fundamental frequency $f_0$, the term of order n of the said series being adjusted in amplitude and in phase so as to minimize the component at the frequency $n \cdot f_0$ of the error signal. The excitation signal ($e_2^{N-1}(t)$) of rank N−1 is taken as excitation signal for the second movable mass.

5 Claims, 1 Drawing Sheet

(56) References Cited

U.S. PATENT DOCUMENTS

| | | | |
|---|---|---|---|
| 7,121,099 B2 * | 10/2006 | Shimizu et al. | 62/6 |
| 7,257,949 B2 * | 8/2007 | Shimizu et al. | 60/517 |
| 2008/0284549 A1 * | 11/2008 | Bedell | 335/170 |
| 2010/0163333 A1 * | 7/2010 | Patil et al. | 180/402 |

OTHER PUBLICATIONS

French Search Report for FR0753813.

* cited by examiner

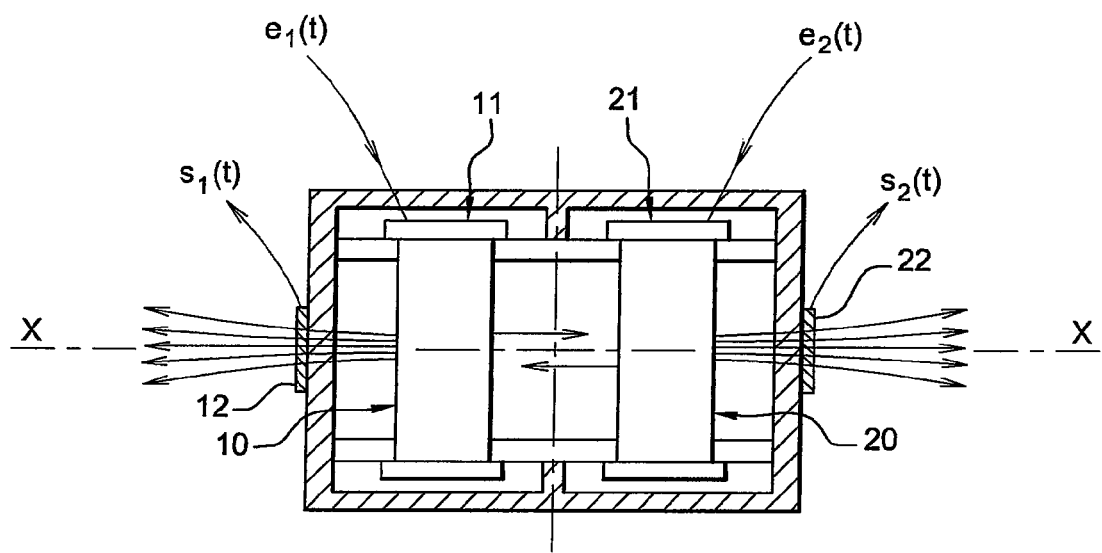

METHOD FOR BALANCING THE MOVEMENT OF MOBILE MASSES IN A BI-LINEAR ELECTRODYNAMIC MOTOR

CROSS-REFERENCE TO RELATED APPLICATIONS

This application is a §371 of International PCT Application PCT/FR2008/050053, filed Jan. 11, 2008.

BACKGROUND

1. Field of the Invention

The present invention relates to a method for balancing the motion of the movable masses of a bilinear electrodynamic motor.

The invention finds a particularly advantageous application in the field of alternating-cycle cryogenic machines, Stirling machines or pulsed-gas tubes, implementing bilinear electrodynamic motors with movable masses forming pistons, and more especially cryogenic machines intended to be carried onboard spacecraft such as Earth observation satellites. In this application, the bilinear electrodynamic motors play the role of compressor of the fluid used, helium for example.

2. Related Art

The operating principle of a bilinear electrodynamic motor is based on the generation, by induction coils, of cyclic magnetic forces which impart a rectilinear motion to the magnetized movable masses constituting the pistons of the motor and which are mounted on mechanical bearings which, on account of their construction, develop an axial elastic restoring force proportional to the displacement of the movable masses. The latter are therefore characterized by a mechanical resonant frequency determined by the mass in motion, the stiffness of the bearing, the magnetic stiffness and the fluidic loading.

The driving of the motor then consists in applying an excitation current to the induction coils at the mechanical resonant frequency of the magnetized movable masses, so as to obtain a natural amplification of the displacement motion of the pistons.

In bilinear electrodynamic compressors, the movable masses of the pistons are aligned in the same compression chamber and oscillate in mechanical opposition at the frequency of the coil excitation current, generally a sinusoidal current. This assemblage exhibits the advantage of a natural balancing of the movable masses in motion, which is not the case for single-piston linear compressors.

However, the tolerances on the mechanical and magnetic parameters, such as the mass, the mechanical and magnetic rigidity, the alignment, etc., lead to slightly different mechanical responses of the two half-motors for an identical electrical setpoint, and consequently induce vibrations of the motor along the axis of displacement of the movable masses of the pistons.

In an application to satellite-based Earth observation, this residual vibratory level leads to a degradation in image capturing, all the more so as the severe mechanical environment during launch in terms of vibrations and of impacts of the launcher, as well as the thermal environment in orbit excluding any thermal transfer by convection, demand that the compressor be fixed in a rigid manner on the structure of the satellite, thus promoting the propagation of the vibrations generated by the compressor towards the other equipment also fixed to the structure of the satellite, in particular the image capturing cameras.

Moreover, having regard to the required lifetimes (between 5 and 10 years), it is necessary to track the evolution of the balancing of the compressor so as to guarantee a minimum level of induced vibrations throughout the aging.

Current solutions for reducing the residual vibrations due to a defect in balancing the motion of the movable masses consist in optimizing the setpoint of the drive current for one of the movable masses with respect to the other, according to a master-slave system.

For this purpose, load sensors or accelerometers are placed in mechanical relation with the compressor so as to provide a measurement of the vibrations induced, on the compressor, by a possible imbalance between the displacements of the two pistons. The optimal setpoint of the drive current for the slave-piston is obtained when the vibration measurement obtained by the load sensors or the accelerometers is at a minimum.

The load sensors are piezo-electric washers placed at the mechanical interfaces for fixing the compressor with the structure of the satellite. Sensors of this type present a certain number of drawbacks, however.

First of all, while they are capable of measuring the residual vibrations specific to the compressor, the load sensors may also record those originating from other equipment fixed to the same mechanical structure of the satellite. The measurement of the vibrations sought is therefore disturbed by the mechanical environment of the compressor.

As piezo-electric sensors are poor thermal conductors, it is necessary to provide a different thermal path from the mechanical path passing through the washers to discharge the thermal dissipations of the compressor, namely the heat of compression of the gas, losses due to the Joule effect, to eddy currents, to hysteresis, etc. By way of example, an ad hoc thermal path can be achieved with conducting braids placed in short-circuit on the piezo-electric washers. This very obviously results in complex and more expensive integration.

Finally, it is very difficult to obtain a redundancy of these load sensors, considering their specific mechanical setup.

Likewise, the use of accelerometers disposed on the compressor does not lead to satisfactory results for the following reasons.

The measurement provided by the accelerometers generally exhibits a low signal-to-noise ratio on account of the significant masses on which the compressor is fixed. Moreover, the force transmitted is reconstructed by interpretation of the acceleration measurement according to an effective mass, the resultant of the movable masses, which is difficult to evaluate and therefore imprecise.

Just as for the load sensors, the acceleration measurement is disturbed by the mechanical environment around the compressor, thus leading to the measurement of accelerations which do not depend on the compressor.

In reality, the acceleration measurement is well adapted to a suspension mounting of the compressor and not to mounting on a rigid interface by bolting.

However, a traditional suspension mounting, necessary for correct measurement of the acceleration, decouples the structure from the interfaces and therefore imposes conditions that are hardly compatible with space applications, like the creation of a specific thermal path to discharge the heat dissipations and the installation of a mechanism for disabling the suspension, and then for re-enabling when the compressor has to support external mechanical loadings.

Finally, the accelerometers and their associated conditioning are expensive.

SUMMARY OF THE INVENTION

Hence, the aim of the invention is to propose a method for balancing the motion of the magnetized movable masses of a bilinear electrodynamic motor, which would allow the implementation of the master-slave drive system mentioned above, on the basis of measurements of displacement of the movable masses which would not be disturbed by the mechanical environment external to the motor.

This aim is attained, in accordance with the invention, on account of the fact that the said method comprises steps consisting in:

providing at least one first magnetic sensor and at least one second magnetic sensor which are able to deliver respectively a first electrical signal and a second electrical signal respectively representative of the motion of a first and of a second movable mass, recording an error signal equal to the difference between the said first and second electrical signals and performing a harmonic analysis of the said error signal, applying a sinusoidal excitation signal at a given frequency $f_0$ to the first movable mass, iteratively applying N successive excitation signals to the second movable mass, an excitation signal of rank n (0≤n≤N−1) being equal to a Fourier series of order n of fundamental frequency $f_0$, the term of order n of the said series being adjusted in amplitude and in phase so as to minimize the component at the frequency $n \cdot f_0$ of the said error signal, taking the excitation signal obtained at the iteration of rank N−1 as excitation signal for the second movable mass.

Thus, it is firstly understood that the method according to the invention operates on the basis of signals which are representative of the displacement of the movable masses and provided by magnetic sensors, such as Hall-effect sensors placed for example on the casing of the motor, intercepting a density, variable as a function of their displacement, of the magnetic flux generated by the magnetized movable masses.

It follows from this that the displacement measurements thus obtained are independent of the environment of the motor, at least as long as no other item of equipment in proximity to the motor provides a variable magnetic flux density.

Moreover, it is also understood that the iterative method proposed by the invention consists in constructing an excitation signal for the slave movable mass as a Fourier series, each term of which minimizes the corresponding harmonic of the error signal, the signal applied to the master-movable mass being the sinusoidal excitation signal at the fundamental frequency, applied to the induction coil associated with this master movable mass. Optimal balancing of the motion of the movable masses and, consequently, a reduction in the minimum residual vibrations are obtained under these conditions.

The invention also presents many other advantages.

The balancing of the movable masses can be performed at any time, especially for the duration of the mission of the satellite so as to take account of the aging of the parts of the motor.

Unlike the known measurement systems based on load sensors or accelerometers, no particular modification or adaptation need be made to the mechanical and thermal interfaces of the motor with its environment, such as for example a compressor fixed to the structure of a satellite.

The signals representative of the motion of the movable masses are obtained without resorting to intrusive sensors which would affect the operation of the motor.

Finally, it is very easy to achieve a redundancy of the system by placing several magnetic sensors at various locations on the casing of the motor, the exact siting of the sensors not having any importance from the moment they are capable of intercepting a sufficient magnetic flux density to obtain a minimum signal-to-noise ratio.

The description which follows with regard to the appended drawing, given by way of nonlimiting example, will elucidate the gist of the invention and the manner in which it may be achieved.

BRIEF DESCRIPTION OF THE FIGURES

For a further understanding of the nature and objects for the present invention, reference should be made to the detailed description, taken in conjunction with the accompanying drawing, in which like elements are given the same or analogous reference numbers and wherein:

FIG. 1 is a view in section of a compressor equipped with magnetic sensors for the implementation of the method in accordance with the invention.

DETAILED DESCRIPTION OF THE INVENTION

In FIG. 1 is represented a linear electrodynamic motor intended for example to be integrated in the guise of compressor into an alternating-cycle cryogenic machine of the Stirling type, pulsed-gas tube or the like, or continuous-flux cryogenic machines of the Joule-Thomson type. The motor of FIG. 1 comprises two movable masses 10, 20 forming two pistons tasked with compressing a cryogenic fluid, such as helium.

In operation, the two movable masses 10, 20 move in opposite senses parallel to the axis X-X of the motor according to a reciprocating motion whose frequency $f_0$ is chosen substantially equal to the resonant frequency of the electromotor assembly and of its fluidic loading. A typical value of this resonant frequency is for example 50 Hz. At this frequency, the amplitude of the motion of the movable masses is then at a maximum and is limited only by the damping forces due to the various mechanical frictions, which are rendered as small as possible for maximum efficiency of the motor.

Moreover, the reciprocating motion of the pistons is obtained by applying a sinusoidal excitation signal at the frequency $f_0$ to induction coils 11, 21. The magnetic coupling of the pistons with the coils 11, 21 is achieved by means of permanent magnets carried by the movable masses 10, 20.

As was mentioned above, in spite of the fact that the bilinear motor of FIG. 1 is designed so that the motion of the movable masses is naturally balanced, slight imbalances in amplitude and in phase between the displacements of the movable masses 10, 20 may occur for various reasons, the consequence thereof being the appearance of residual vibrations responsible for degradations in the quality of the image capturing of the satellite's cameras.

To limit these induced vibrations, provision is made to equip the motor with magnetic sensors 12, 22, for example Hall-effect sensors, able to provide respectively a first electrical signal $s_1(t)$ representative of the motion of the mass 10 and a second electrical signal $s_2(t)$ representative of the motion of the mass 20. These electrical signals $s_1(t)$ and $s_2(t)$ originate from the variation in the magnetic induction across the sensors 12, 22, due to the variation in the density of the magnetic flux created by the magnetized masses in the course of their motion, as is represented in FIG. 1 by divergent magnetic field lines emanating from the magnetized masses 10, 20. In the course of the motion of the movable masses, the sensors intercept more or fewer field lines, hence the magnetic flux variation and the resulting induced current.

In the example of FIG. 1, the magnetic sensors 12, 22 have been placed on the longitudinal axis X-X of the motor. Of course, they could be placed at some other location on the casing of the motor, for example laterally, the only condition being that they can detect density variations of the magnetic fluxes created by the magnetized movable masses 10, 20.

The motion of the movable masses 10, 20 is obtained by applying an excitation signal $e_1(t)$ to the coil 11 of the first movable mass 10, which will later be chosen as master-mass, and an excitation signal $e_2(t)$ to the coil 21 of the second movable mass 20, which will be chosen as slave-mass. These excitation signals are periodic with frequency $f_0$.

If the two half-motors are perfectly balanced, the difference $\Delta s(t)=s_1(t)-s_2(t)$, which will be called the error signal, is zero. However, it was seen above that in practice there exists between the two motions an imbalance, a source of residual vibrations, that the invention seeks to correct in the best manner possible.

For this purpose, the periodic error signal $\Delta s(t)$ of frequency $f_0$ is recorded and subjected to a harmonic analysis so as to perform a decomposition into N Fourier components of frequency $n \cdot f_0$ with $0 \leq n \leq N-1$ being a given arbitrary number chosen as a function of the correction level sought.

The respective amplitude of the Fourier components of the error signal $\Delta s(t)$ will be denoted $C_0, \ldots, C_n, \ldots, C_{N-1}$.

A sinusoidal excitation signal at the frequency $f_0$ is applied to the master-mass 10:

$$e_1(t) = A_1 \cdot \sin(2\pi f_0 t)$$

Then an iteration of the excitation signal for the slave-mass 20 is performed in the following manner.

A first excitation signal of zero frequency (n=0)

$$e_2^0(t) = B_0$$

is applied to the slave-mass 20. The coefficient $B_0$ is then adjusted to an optimal value $B'_0$, such that the corresponding coefficient $C_0$ of the error signal is at a minimum.

Thereafter, a new excitation signal:

$$e_2^1(t) = B'_0 + B_1 \cdot \sin(2\pi f_0 t + \phi_1)$$

is applied to the slave-mass 20 and the coefficient $B_1$ and the phase $\phi_1$ are adjusted so as to minimize the coefficient $C_1$ of the error signal. Let $B'_1$ and $\phi'_1$ be the corresponding values.

At iteration rank n, an excitation signal $e_2^n(t)$ given by:

$$e_2^n(t) = B'_0 + B'_1 \cdot \sin(2\pi f_0 t + \phi'_1) + B'_2 \cdot \sin(2\pi(2f_0)t + \phi'_2) + \ldots + B_n \cdot \sin(2\pi(n \cdot f_0)t + \phi_n)$$

is applied to the slave-mass.

Again, the coefficient $B_n$ and the phase $\phi_n$ are adjusted so as to minimize the coefficient $C_n$.

The iteration continues thus up to the last rank n=N−1.

Ultimately, the optimal excitation signal for the slave movable mass 20 equals:

$$e_2(t) = e_2^{N-1}(t) = B'_0 + \sum_{n=1}^{N-1} B'_n \cdot \sin(2\pi(n \cdot f_0)t + \varphi'_n)$$

It will be noted that this procedure can be performed at any time, even when the satellite is in flight.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for balancing the motion of the magnetized movable masses of a bilinear electrodynamic motor comprising two movable masses moving in opposite senses parallel to the axis (x-x) of the motor according to a reciprocating motion, the movable masses constituting two pistons aligned in one and the same compression chamber and oscillating in mechanical opposition, said method comprising the steps of:

providing at least one first magnetic sensor and at least one second magnetic sensor which are able to deliver a first electrical signal ($s_1(t)$) and a second electrical signal ($s_2(t)$), respectively, that are representative of the motion of a first movable mass and of a second movable mass, respectively;

recording an error signal ($\Delta s(t)$) equal to the difference between said first ($s_1(t)$) and second ($s_2(t)$) electrical signals and performing a harmonic analysis of the said error signal;

applying a sinusoidal excitation signal ($e_1(t)$) at a given frequency $f_0$ to the first movable mass;

iteratively applying N successive excitation signals ($e_2^n(t)$) to the second movable mass, an excitation signal of rank n ($0 \leq n \leq N-1$) being equal to a Fourier series of order n of fundamental frequency $f_0$, the term of order n of the said series being adjusted in amplitude and in phase so as to minimize the component at the frequency $n \cdot f_0$ of the said error signal; and taking the excitation signal ($e_2^{N-1}(t)$) obtained at the iteration of rank N−1 as excitation signal for the second movable mass.

2. The method of claim 1, wherein said magnetic sensors are Hall-effect sensors.

3. The method of claim 1, wherein the two movable masses comprise two pistons adapted to compress a cryogenic fluid and move in opposite senses parallel to the axis X-X of the motor according to a reciprocating motion whose frequency $f_0$ is chosen equal to the resonant frequency of the motor assembly.

4. The method of claim 3, wherein the reciprocating motion of the pistons is obtained by applying a sinusoidal excitation signal at a frequency $f_0$ to induction coils, the magnetic coupling of the pistons with the coils being achieved by means of permanent magnets carried by the movable masses.

5. The method of claim 3, wherein:

an excitation signal $e_1(t)$ is applied to the coil of the first movable mass, termed the "master-mass", and an excitation signal $e_2(t)$ is applied to the coil of the second movable mass, termed the "slave-mass", these excitation signals being periodic of frequency $f_0$, the periodic error signal $\Delta s(t) = S_1(t) - S_2(t)$ of frequency $f_0$ is recorded and subjected to a harmonic analysis so as to perform a decomposition into N Fourier components of frequency $n \cdot f_0$ with $0 \leq n \leq N-1$, $C_0, \ldots, C_n, \ldots, C_{N-1}$, being the respective amplitude of the Fourier components of the error signal $\Delta s(t)$, a sinusoidal excitation signal at the frequency $f_0$ is applied to the master-mass:

$$e_1(t) = A_1 \cdot \sin(2\pi f_0 t);$$

then an iteration of the excitation signal for the slave-mass is performed in the following manner:

a first excitation signal of zero frequency (n=0)

$$e_2^0(t) = B_0$$

is applied to the slave-mass;

the coefficient $B_0$ is then adjusted to an optimal value $B_0'$ such that the corresponding coefficient $C_0$ of the error signal is at a minimum, a new excitation signal:

$$e_2^1(t) = B_0' + B_1 \cdot \sin(2\pi f_0 t + \phi_1)$$

is thereafter applied to the slave-mass and the coefficient $B_1$ and the phase $\phi_1$ are adjusted so as to minimize the coefficient $C_1$ of the error signal, $B_1'$ and $\phi_1'$ being the corresponding values, at iteration rank n, an excitation signal $e_2^n(t)$ given by:

$$e_2^n(t) = B_0' + B_1' \cdot \sin(2\pi f_0 t + \phi_1') + B_2' \cdot \sin(2\pi(2 \cdot f_0)t + \phi_2') + \ldots + B_n \cdot \sin(2\pi(n \cdot f_0)t + \phi_n)$$

is applied to the slave-mass (20);

again, the coefficient $B_n$ and the phase $\phi_n$ are adjusted so as to minimize the coefficient $C_n$;

the iteration continues thus up to the last rank n=N−1; and the optimal excitation signal for the slave movable mass (20) ultimately equals:

$$e_2(t) = e_2^{N-1}(t) = B_0' + \sum_{n=1}^{N-1} B_n' \cdot \sin(2\pi(n \cdot f_0)t + \varphi_n').$$

\* \* \* \* \*